Patented Jan. 2, 1940

2,185,591

UNITED STATES PATENT OFFICE 2,185,591

DISPERSIBLE THIOCARBANILIDE

David W. Jayne, Jr., Port Chester, N. Y., assignor to American Cyanamid Company, New York, N. Y., a corporation of Maine No Drawing. Application August 24, 1938, Serial No. 226,583

5 Claims. (Cl. 252—9)

This invention relates to a dispersible thiocarbanilide.

Thiocarbanilide has important properties as a flotation promotor, but its use has hitherto been greatly curtailed in spite of its desirable characteristics because it is very insoluble in water and is not easily wetted. In order to exert promotor action, it is not necessary for the thiocarbanilide to be in true solution, but it is necessary for it to be in the form of a very fine and uniform dispersion which has been an almost impossible achievement with the ordinary thiocarbanilide of commerce.

I have found that if thiocarbanilide is mixed with a protective agent and preferably a wetting agent so that the particles of thiocarbanilide are thoroughly coated with the protective agent and uniformly admixed with the wetting agent, which protective agent should be a material that is readily dissolved or dispersed in water, the material will readily disperse in water and can be dried at low temperatures to form a substantially dry product which also readily disperses. Drying should be effected at temperatures below that at which the protective agent is transformed into a form which is not readily rehydratable.

The protective agents belong to two general classes; namely, colloidal material such as molasses, alcohol slops which are the residue from the fermentation of molasses to produce ethyl alcohol and comprise a mixture of carbohydrate and protein material, lignin sulfonates, and the like, and materials which are relatively dry but which contain materials of the class known as saponins such as, for example, licorice root and soap bark. In general, the protective agents belonging to the first class may be almost any of the readily rehydratable colloids.

The added wetting agent may be of the type of soaps, or the modern wetting agents such as sulfonated alkylnaphthalenes, sulfated alcohols, esters of sulfosuccinic acid, and the like.

The invention will be described in detail in conjunction with the following specific examples.

Example 1

Finely divided thiocarbanilide is mixed with alcohol slops to form a paste containing from 50% to 60% of thiocarbanilide. This paste readily disperses in water and the thiocarbanilide content is completely wetted.

A similar paste can be obtained with molasses.

Example 2

500 parts of thiocarbanilide and 10 parts of finely divided soap bark are mixed in a dough mixer, such as a Werner & Pfleiderer dough mixer, with a solution of 5 parts of sodium isopropylnaphthalene sulfonate in 150 parts of water. A smooth putty-like, damp mass results which is mixed until substantially all of the thiocarbanilide particles are coated with the soap bark which usually takes at least one hour. The paste is then dried under a vacuum at a low temperature, forming a dry, free-flowing powder which is readily and completely dispersible in water. The product contains more than 95% of thiocarbanilide and can be fed into a grinding or flotation circuit in the form of an aqueous suspension instead of a dry solid and will stay dispersed in a grinding mill or flotation machine.

Example 3

500 parts of thiocarbanilide and 10 parts of a calcium lignin sulfonate marketed under the trade name "Goulac" are introduced into a Werner & Pfleiderer mixer with a solution of 5 parts of sodium isopropylnaphthalene sulfonate in 150 parts of water. Mixing and drying are effected as in Example 2 and a dry powder is obtained which disperses readily and does not tend to precipitate out in grinding circuits or flotation machines.

Example 4

500 parts of thiocarbanilide and 10 parts of licorice root are introduced into a Werner & Pfleiderer mixer, together with 155 parts of a 3% soap solution. Mixing and drying are carried out as described in Example 2 and a dry product is obtained which disperses readily, although not quite as readily as that of Examples 2 and 3.

In the claims the term "saponins" is used to cover the common materials containing saponin. These materials are not pure saponin but contain various quantities thereof.

What I claim is:

1. A dispersible thiocarbanilide comprising thiocarbanilide, the individual particles of which are coated with a film of a hydrophilic, readily rehydratable protective agent belonging to the group consisting of rehydratable carbohydrate colloids, alcohol slops from the fermentation of molasses to produce ethyl alcohol, lignin sulfonates and saponins, the product being readily dispersible in water and remaining dispersed in froth flotation operations.

2. A free-flowing dispersible thiocarbanilide powder in which the individual particles of thiocarbanilide are coated with an adherent coating of calcium lignin sulfonate and admixed with at least one wetting agent, the wetting agent being present to the extent of a very small percentage of the thiocarbanilide, the product being readily dispersible in water and remaining dispersed in froth flotation operations.

3. A free-flowing dispersible thiocarbanilide powder in which the individual particles of thiocarbanilide are coated with an adherent coating of licorice root and admixed with at least one wetting agent, the wetting agent being present to the extent of a very small percentage of the thiocarbanilide, the product being readily dispersible in water and remaining dispersed in froth flotation operations.

4. A free-flowing dispersible thiocarbanilide powder in which the individual particles of thiocarbanilide are coated with an adherent coating of soap bark and admixed with at least one wetting agent, the wetting agent being present to the extent of a very small percentage of the thiocarbanilide, the product being readily dispersible in water and remaining dispersed in froth flotation operations.

5. A method of producing a free-flowing, readily dispersible thiocarbanilide powder which comprises admixing thiocarbanilide with a readily rehydratable hydrophilic protective agent and a wetting agent, the wetting agent being present to the extent of a very small percentage of the thiocarbanilide, in the form of a stiff paste until the thiocarbanilide particles are substantially completely coated with an adherent film of the protective agent and drying at a temperature below that at which the protective agent loses its rehydratable characteristics.

DAVID W. JAYNE, Jr.